W. H. GARLOCK.
BREAD SLICING DEVICE.
APPLICATION FILED SEPT. 29, 1919.

1,334,696.

Patented Mar. 23, 1920.
2 SHEETS—SHEET 2.

Witness
P. H. Armstrong

Inventor
William H. Garlock,
By Lester L. Sargent
Attorney

W. H. GARLOCK.
BREAD SLICING DEVICE.
APPLICATION FILED SEPT. 29, 1919.

1,334,696.

Patented Mar. 23, 1920.
2 SHEETS—SHEET 1.

Witness

Inventor
William H. Garlock
By Lester L. Sargent
Attorney

UNITED STATES PATENT OFFICE.

WILLIAM H. GARLOCK, OF SEATTLE, WASHINGTON.

BREAD-SLICING DEVICE.

1,334,696. Specification of Letters Patent. Patented Mar. 23, 1920.

Application filed September 29, 1919. Serial No. 327,051.

*To all whom it may concern:*

Be it known that I, WILLIAM H. GARLOCK, a citizen of the United States, residing at Seattle, in the county of King and State of Washington, have invented a new and useful Bread-Slicing Device, of which the following is a specification.

The object of my invention is to provide an improved type of bread slicing device which can be manufactured at less cost than prior devices of this character, but which is equally effective in affording means for cutting slices of bread of even thickness, while providing means for adjusting the device to cut slices of different thicknesses. I attain the objects of my invention by the mechanism illustrated in the accompanying drawings, in which—

Figure 3:
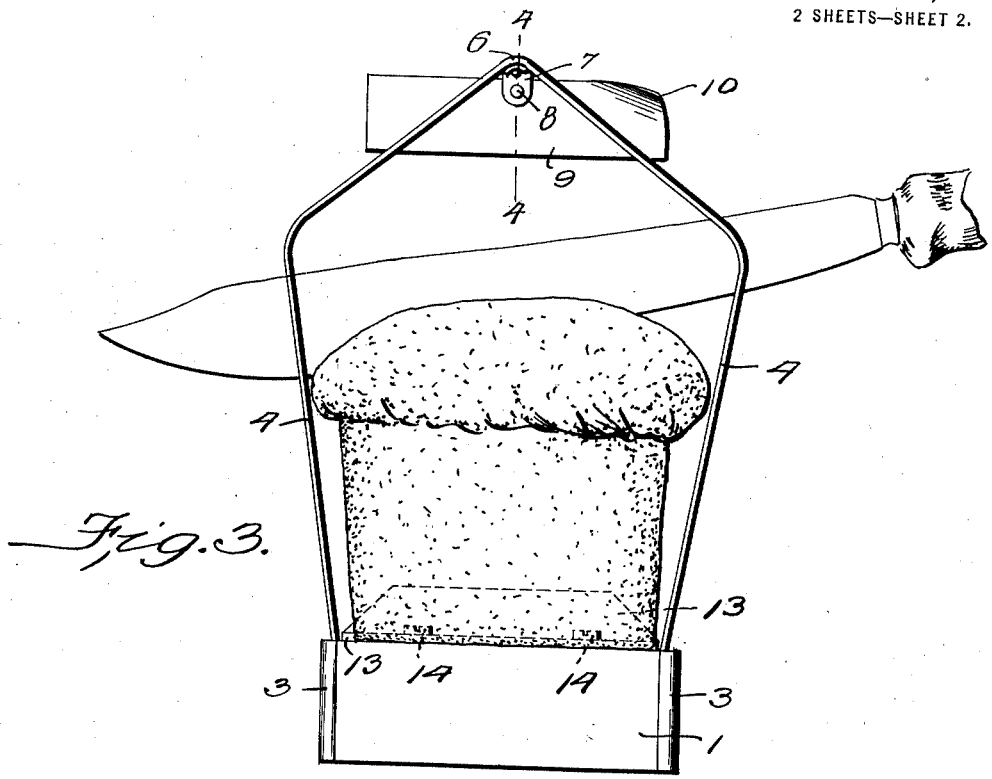
Figure 4:
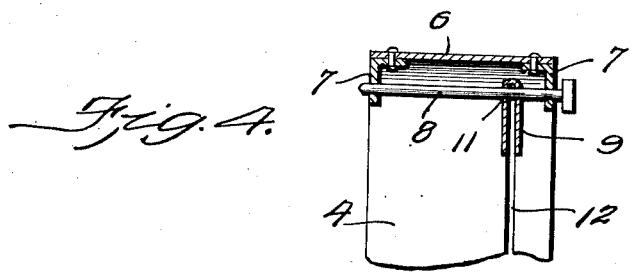
Figure 5:
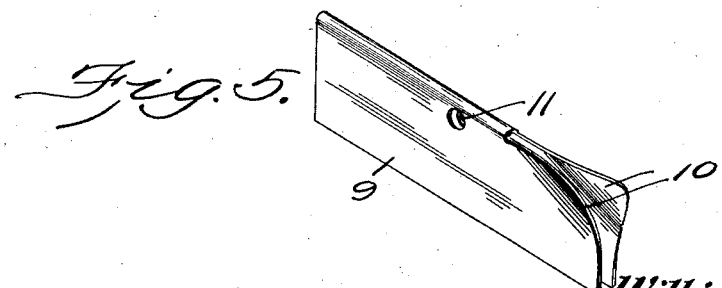
Figure 1:
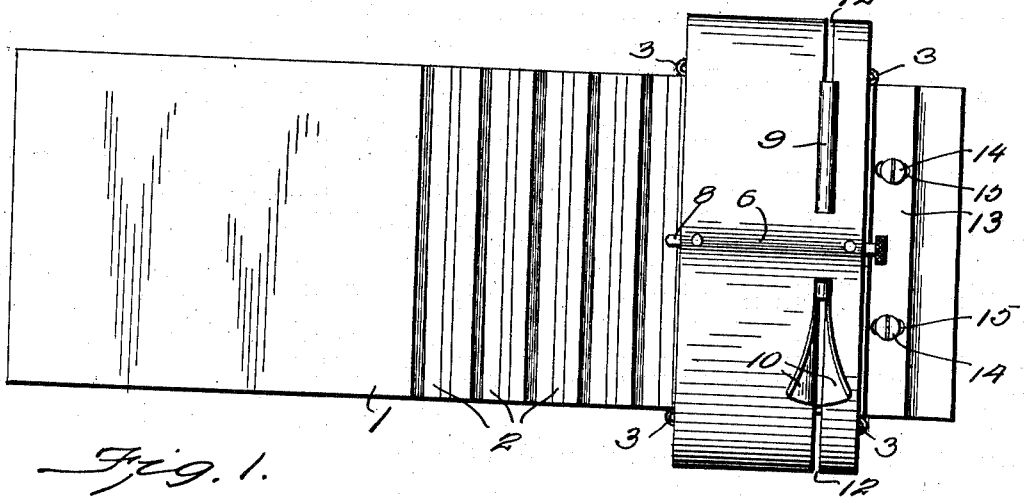
Figure 2:
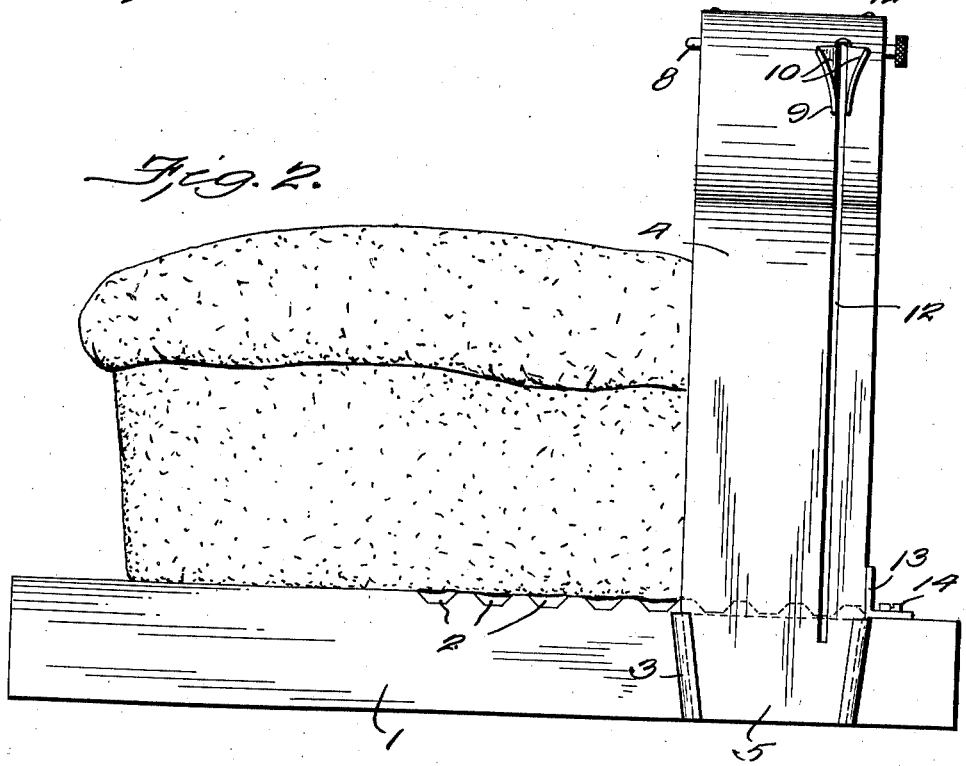

Figure 1 is a top plan of the invention;
Fig. 2 is a side elevation;
Fig. 3 is an end elevation;
Fig. 4 is a section on line 4—4 of Fig. 3; and
Fig. 5 is a perspective view of the knife guide.

Like numerals designate like parts throughout the several views.

Referring to the accompanying drawings I provide a suitable baseboard 1 having a series of corrugations 2, as shown in Figs. 1 and 2. At the corrugated end of the board I provide a suitable stop member 13, L-shaped in cross section, and having elongated slots 15 through which screws 14 are inserted to adjustably secure the stop member to the baseboard. In proximity to stop member 13, I provide on opposite sides of the baseboard reversely disposed projections or gibs 3, adapted to releasably secure the tapered ends 5 of the knife guiding bail 4, as shown in Fig. 2. Bail 4 is provided with opposite slots 12 extending from a point near the top of the bail to a point below the corrugated upper surface of the baseboard 1. Mounted in the upper ends of the opposite slots 12 by means of a pin 8, I provide a knife guide 9 having openings 11 through which pin 8 extends. Pin 8 is mounted in lugs 7 which depend from the apex 6 of bail 4. Knife guide 9 is provided with outturned ends 10 to facilitate the position of the bread knife through the knife guide.

In operation the bail 4 may be lifted out of the gibs 3 when the device is not in use, or for more conveniently inserting a loaf of bread in position to be sliced. In such position the end of the loaf abuts the stop member 13. The knife is inserted through slot 12 of bail 4, being guided from the slot on one side to the opposite side by the knife guide 9, the outturned ends of which facilitate the insertion of the point of the knife. As shown in Fig. 3 the knife is then pressed downward, guided in slots 12. Adjustment of stop member 13 permits of the cutting of slices of different thicknesses.

From a manufacturing standpoint an important improvement is made by the reduction of the number of parts required to provide a useful device, to the minimum, thus reducing the cost of manufacture and sale of the invention.

What I claim is:

1. In a bread slicing device, the combination of a baseboard, a knife guiding bail mounted on the baseboard and having opposite slots, and means mounted in the upper ends of said slots to guide the bread knife from the nearer to the farthest slot.

2. In a bread slicing machine, the combination of a baseboard, means attached to opposite sides of the baseboard near one end to releasably support a knife guiding bail member, a knife guiding bail member having opposite knife guiding slots extending to a point below the upper surface of the baseboard, and a knife guide attached to the apex of the bail and positioned in the slots to guide the knife from one slot to the opposite slot, said knife guide having upturned ends.

3. As a new article of manufacture for use in a bread slicing machine, a knife guide consisting of a substantially rectangular plate bent along its longitudinal central portion, said member having slightly curved outturned free ends adapted to receive the point of the bread knife, and having openings for the insertion of a fastening member.

4. In combination with the device described in claim 3, a knife guiding bail having opposite slots extending from near its apex to a point near its free ends, and means attached to the apex of said bail for securing the above described knife guide in operative position in the slots of the bail.

WILLIAM H. GARLOCK.